United States Patent [19]

Miura et al.

[11] Patent Number: 4,719,611
[45] Date of Patent: Jan. 12, 1988

[54] APPARATUS FOR CONTROLLING A RECORDING OPERATION OF AN OPTICAL INFORMATION RECORDING APPARATUS

[75] Inventors: Yoshio Miura; Motoyuki Suzuki, both of Yokohama, Japan

[73] Assignee: Hitachi, Ltd., Tokyo, Japan

[21] Appl. No.: 757,668

[22] Filed: Jul. 22, 1985

[30] Foreign Application Priority Data

Jul. 23, 1984 [JP] Japan ................................ 59-151217

[51] Int. Cl.⁴ .............................................. G11B 7/00
[52] U.S. Cl. ........................................ 369/47; 369/33
[58] Field of Search .................... 369/32, 33, 47, 48, 369/50; 358/342; 360/71, 72.1, 72.2, 77

[56] References Cited

U.S. PATENT DOCUMENTS

| 4,460,931 | 7/1984 | Takeuchi | 360/71 |
| 4,573,084 | 2/1986 | Iida | 369/32 |
| 4,641,294 | 2/1987 | Yoshimaru | 369/32 |

Primary Examiner—Robert L. Richardson
Attorney, Agent, or Firm—Antonelli, Terry & Wands

[57] ABSTRACT

A control circuit for an optical information recording apparatus having a recording device for optically recording information on a recording track of a recording medium, a recording positioning detection device detects the recording start position mark cut on the recording track when a recording start is commanded. Then, recording is started and continued for a predetermined number of tracks. When it is desired to interrupt the recording in mid course, a recording interruption is commanded and the recording is interrupted only when the first recording start position marks after the recording interruption command, has been detected.

5 Claims, 21 Drawing Figures

APPARATUS FOR CONTROLLING A RECORDING OPERATION OF AN OPTICAL INFORMATION RECORDING APPARATUS

BACKGROUND OF THE INVENTION

1. Field of the Invention

This invention relates to an optical information recording apparatus, in particular to a control circuit for controlling the start and interruption of its recording operation.

2. Description of the Related Arts

Devices for optically recording information on a recording medium, for example a video-disk, are known in the art. These are devices, for which a disk-shaped information carrier (hereinbelow abbreviated a disk), on which a photosensitive substance is applied or deposited by evaporation, is irradiated with a light beam (hereinbelow abbreviated by a light spot) coming from a laser light source. Information is recorded in the form of variations in optical characteristics due to melting and vaporization of the part of the substance irradiated with the light spot or to variations in the light reflection or transmission coefficient of that part by modulating the light output intensity with signals to be recorded; and the information thus recorded is reproduced by detecting the variations in optical characteristics. On the disk guide grooves (hereinbelow called guide tracks), which can be optically detected, are cut in advance in order to obtain high density recording tracks or to remove deviations of the trace due to the excentricity of the disk. The recording and reproduction is effected by focussing the light spot on these guide tracks and by bringing it under tracking control so that it follows the guide tracks.

FIG. 1 is a scheme illustrating an example of the disk. In the figure, for the sake of simplicity of explanation, only two concentric circular tracks 2 and 3 adjacent to each other are shown. On the disk 1 groove-shaped guide tracks are cut during fabrication. Address signals 4 for identifying each of the guide tracks are recorded in the hatched areas. A recording positioning mark 5 is formed in the form of a pit. This positioning mark is also used for a rotational synchronization signal of a disk drive motor 6.

FIG. 2 is a diagram showing an example of the optical information recording apparatus. In the apparatus shown in the figure, when an input signal is to be recorded, at first the number of tracks where the signal is to be recorded and a command signal for beginning the recording are inputted by a system control 29 consisting of a microcomputer, etc. to a recording gate circuit 28. Then, the recording positioning mark 5 constituted by the pit is detected by a photosensor 7 and the signal thus obtained is inputted to the recording gate circuit 28 after having been shaped in a waveform shaping circuit 27. The recording gate circuit 28 outputs a high level signal during a period of time corresponding to the number of tracks specified by the system control 29, in response to a recording positioning mark detecting signal coming from the waveform shaping circuit 27 and a recording start command signal coming from the system control circuit 29. A laser driving circuit 30 modulates the output of a laser diode 9 in intensity according to an input signal 8 when the level of the output of the recording gate circuit 28 is high.

The light beam generated by the laser diode 9 is transformed into a parallel light beam by means of a focussing lens 10. Further, since the semiconductor laser light beam has an elliptic cross-section, it is corrected to a light beam having an approximately circular light beam by means of a concave cylindrical lens 11 and a convex cylindrical lens 12. The corrected light beam is injected through a polarizing beam splitter 13 and a ¼-wavelength plate 14 to an objective 16 mounted on an actuator 15. Then the light beam focussed by the objective 16 irradiates the surface of the photosensitive substance on a guide track of the disk 1 and performs the recording on the disk either by melting and vaporizing the part irradiated with the light beam or by varying the reflection or transmission coefficient of that part of the track. Light reflected by the disk 1 passes again through the objective 16 and the ¼-wavelength plate 14 and is led to a convex lens 17 by the polarizing beam splitter 13. Then it is divided into 2 parts by a mirror 18, one of which is directed to a 2-division photodiode 19 for the tracking error detection and the other of which is directed to a 2-division photodiode 22 for the focussing error detection. The output of the photodiode 19 is inputted to a differential amplifier 20 and used for detecting the deviation of the light spot from the guide track by detecting unbalance of the light reflected or diffracted by the disk by means of the differential amplifier 20. The lens 16 is driven in the direction perpendicular to the guide track through a tracking control circuit 21 by an actuator 15 so that this deviation detection output becomes zero, such that the light spot is controlled so as to follow the guide track. The output of the photodiode 22 is inputted to the differential amplifier 23, which detects the distance between the objective 16 and the disk 1. The output of the differential amplifier 23 drive the lens 16 in the direction perpendicular to the disk 1 by means of the actuator 15 through the focussing control circuit 24, controlling its position so that the light spot diameter on the surface of the disk 1 is approximately 1 $\mu$m. Further, the output of the photodiode 22 is also inputted to an amplifier 25, where the recorded signals are reproduced, and the address signal 4 recorded in advance on the disk 1 is demodulated in an address demodulation circuit 26. This address signal is utilized for knowing on which track the recording is actually performed or for counting the number of tracks, on which recording has been already effected.

FIG. 3 is a block diagram showing a concrete construction of the recording gate circuit 28. The recording gate circuit 28 consists of a register 31, a down counter 32, a zero detection circuit 33 and a recording timing control circuit 34. In the case where input signals are recorded, the value (N+1) obtained by adding 1 to the difference N (integer) between the number of the first track at which recording should be begun and the number of the last track at which the recording should be terminated, i.e. the number of tracks on which the recording should be performed is preset in the register 31 by means of the system control 29. The data of this number of tracks are inputted in the DATA terminal in synchronism with the clock pulses to the CLK terminal.

The working mode of the circuit indicated in FIG. 3 will be explained below, referring to FIG. 4. At first an REC pulse b, which is a command signal for starting the recording, is outputted by the system control 29. Upon receiving the REC pulse b, the down counter 32 is loaded with the data of the number of tracks to be recorded, which has been preset in the register 31. The down counter 32 decreases the data of the number of tracks, with which it is loaded, by 1 every time a positioning mark detection signal a (hereinbelow called MARK pulse) coming from the waveform shaping circuit 27 arrives. The recording timing control circuit 34 detects the first MARK pulse, after the REC pulse has been inputted, and then outputs a recording gate signal d of high level. When the level of the recording gate signal d becomes high, the laser driving circuit 30 is activated and the recording on the disk 1 is started according to the input signal 8. When the recording proceeds so far that the number of tracks, with which the down counter 32 is loaded, decreases to zero, the zero detection circuit 33 detects the zero count and outputs a zero detection pulse c. When this zero detection pulse c is inputted, the recording timing control circuit 34 makes the level of the recording gate signal low and deactivates the laser driving circuit 30 so that the recording is terminated.

In much a recording apparatus, in the case where it was desired to interrupt the recording in the course of a recording on several successive tracks, heretofore, since the recording was interrupted at the same time as the input of an interruption signal from the system control 29, sometimes the track on which recording is in mid course is not recorded in whole. This gives rise to the problem that, when the track, for which the recording has been interrupted in mid course, is subsequently played, in a case of the video-disk, reproduced images become unstable and, in the case of a digital recording disk, reproduced data becomes erroneous.

SUMMARY OF THE INVENTION

The object of this invention is to overcome the foregoing problems and to provide a control circuit for an optical information recording apparatus securing a normal reproduction operation, even if the recording is interrupted in the course of a successive recording.

In order to achieve this object, according to this invention, a recording is not interrupted, even if an interruption signal is inputted, before the track on which recording is in mid course is recorded in whole.

DESCRIPTION OF THE PREFERRED EMBODIMENT

Figure 1:
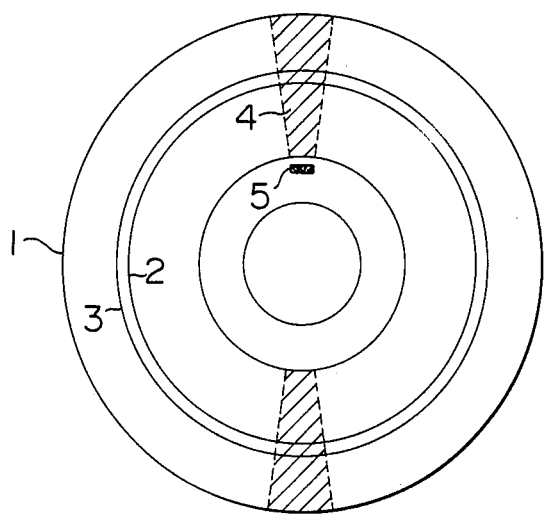
FIG. 1 is a scheme illustrating an example of the optical recording disk.
Figure 2:
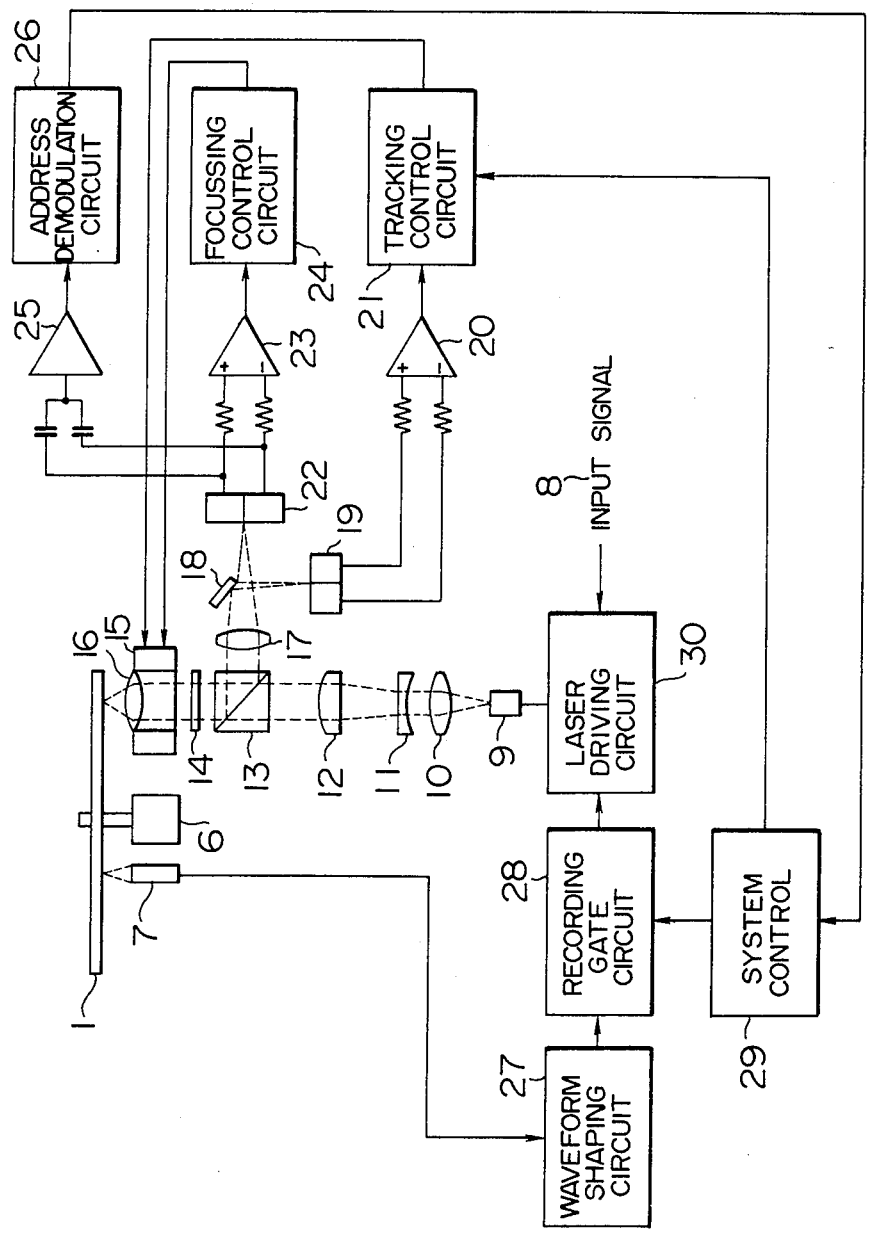
FIG. 2 is a block diagram for an optical information recording apparatus.
Figure 3:
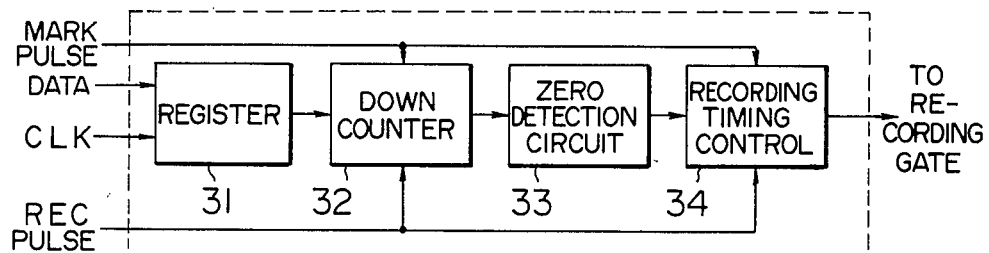
FIG. 3 is a block diagram showing a concrete construction of a recording gate circuit.
Figure 4:
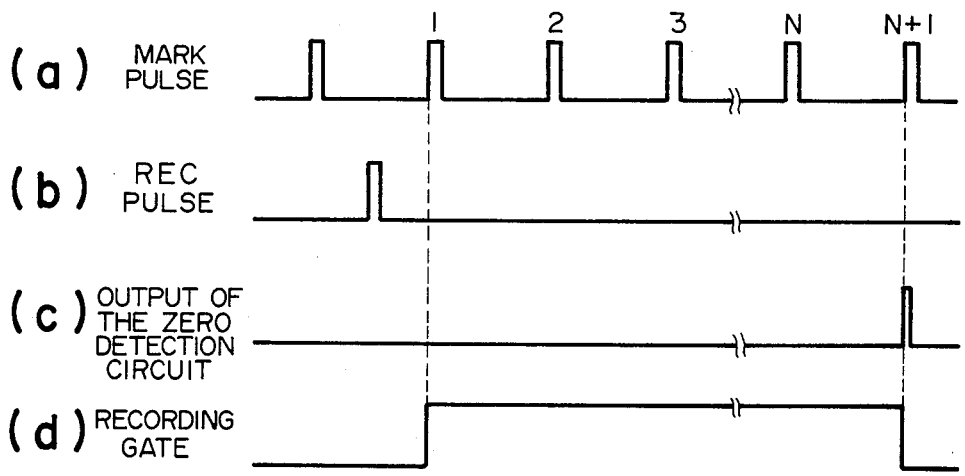
FIGS. 4(a) to 4(d) form a timing chart for various signals in the circuit shown in FIG. 3.
Figure 5:
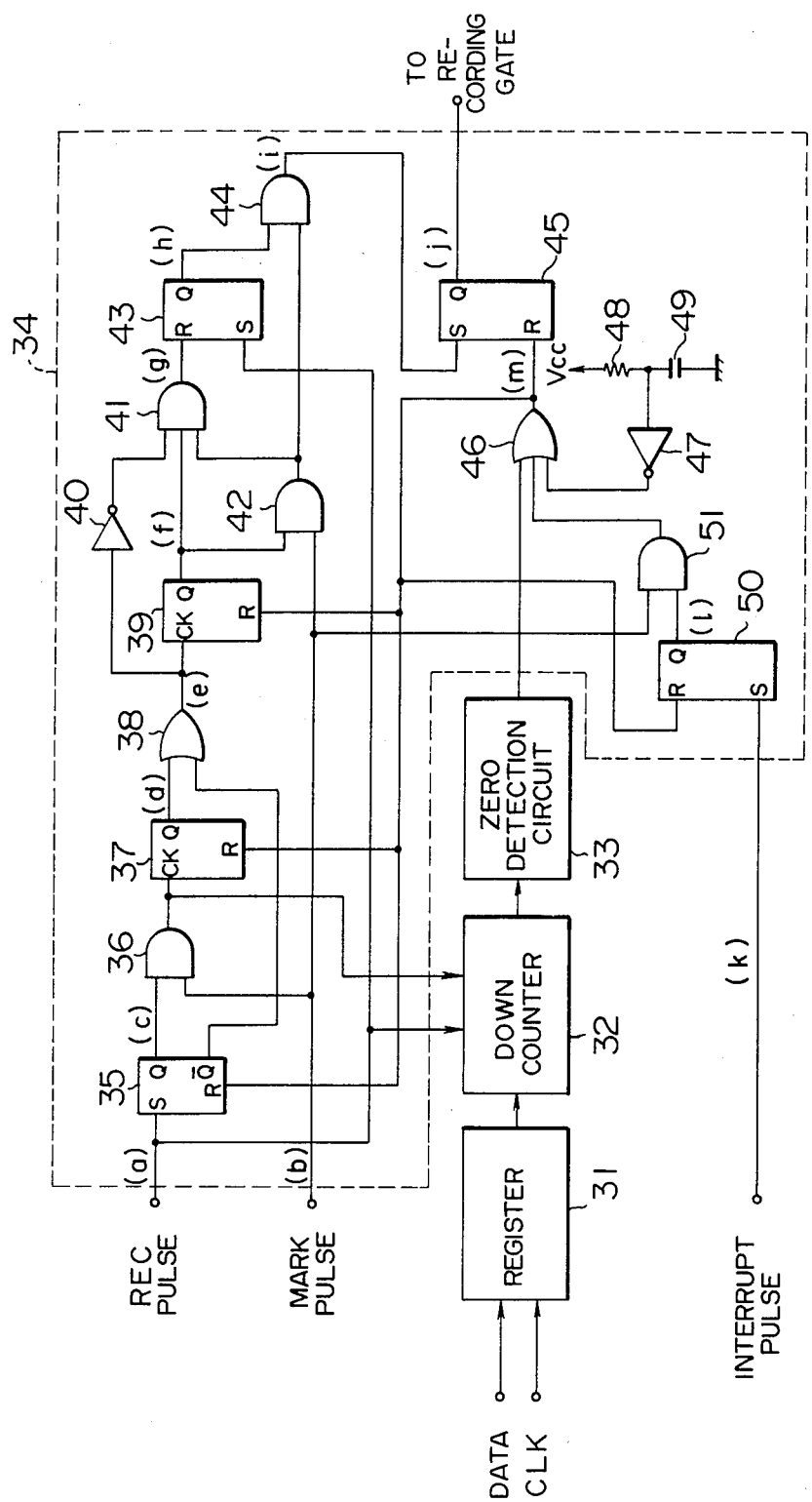
FIG. 5 is a block diagram for a recording timing control circuit representing an example of this invention.
Figure 6:
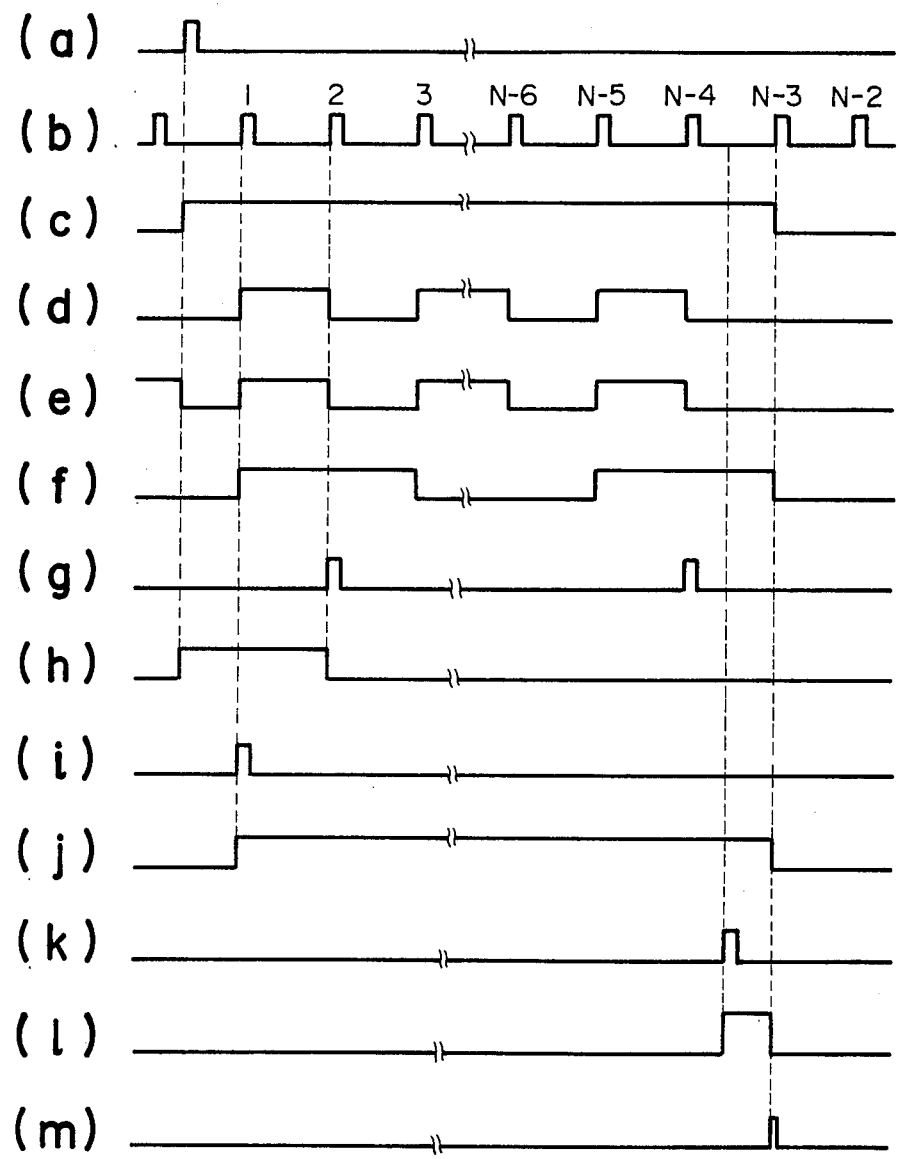
FIGS. 6(a) to 6(m) form a timing chart for various signals in the circuit shown in FIG. 5.

Hereinbelow an embodiment of this invention will be explained, referring to FIGS. 5 and 6. FIG. 5 is a block diagram illustrating an embodiment of this invention, in which principally a recording timing control circuit 34 in shown as the central device. FIG. 6 is a timing chart for explaining the operation of the apparatus indicated in FIG. 5.

In the case where recording is performed, the value (N+1) obtained by adding 1 to the difference N between the number of the first track at which recording should be begun and the number of the last track at which the recording should be terminated is preset by system control 29 in the register 31 by means of DATA and CLK signals. Once the data of the number of tracks has been preset, a REC pulse shown in FIG. 6(a) is inputted by the system control 29 to flip-flops 35 and 43 and to down counter 32. When the REC pulse is inputted, the counter 32 is loaded with the content of the register 31.

In addition, when the REC pulse indicated in FIG. 6(a) is inputted, the flip-flops 35 and 43 are set to a high level, as indicated in FIG. 6(c) and (h), respectively. The output Q of the flip-flop 35 and the MARK pulse outputted by the waveform shaping circuit 27, as indicated in FIG. 6(b), are inputted to a flip-flop 37 and the counter 32, after the formation of their logical product in an AND gate 36. The counter 32 calculates the number of recording tracks by counting this signal. The flip-flop 37 divides the frequency of the output of the AND gate 36, as indicated in FIG. 6(d). The output Q of the flip-flop 37 and the output $\bar{Q}$ of the flip-flop 35 are inputted to flip-flop 39 and inverter 40 after the formation of their logical sum. An AND gate 41 forms a logical product of the outputs of the inverter 40, the flip-flop 39 and an AND gate 42. This signal is inputted to the reset terminal of the flip-flop 43. As soon as a pulse is inputted, the level of the output Q of of the flip-flop 43 becomes low, as indicated in FIG. 6(h). An AND gate 44 detects the first MARK pulse using the low output of flip-flop 43, after the REC pulse indicated in FIG. 6(a) has been inputted. The output of AND gate 44 is inputted to flip-flop 45, which is changed to a high level, as indicated in FIG. 6(j), what begins the recording signal.

The outputs of the zero detection circuit 33, an AND gate 51 and an inverter 47 are used as a reset signal for the flip-flops 35, 37, 39 and 45 after the formation of their logical sum in OR gate 46. A resistance 48 and a capacitor 49 constitutes a circuit for resetting the flip-flops at the moment of switch-on of the power source.

In the case where it is desired to interrupt recording in the course of a recording, an interruption signal k outputted by the system control 29 is inputted to flip-flop 50. As soon as the interruption signal k is inputted, the level of the output Q of the flip-flop 50 becomes high ((l) in FIG. 6). The AND gate 51 detects the first MARK pulse (N-3 in FIG. 6) by using this high signal (l), after the interruption signal has been inputted, and inputs a reset signal m through the OR gate 46 to the flip-flops 35, 37, 39, 45 and 50. As soon as this reset signal is inputted, the flip-flop 45 is changed from the high level to the low level, as indicated in FIG. 6(j), and the recording is interrupted.

Furthermore, although in the above the count of the number of recording tracks was effected by means of the signal obtained by detecting the recording positioning mark 5 disposed in advance on the disk, it is not limited to this method, for example, the count can be effected by means of a signal obtained by detecting the address signal recording section 4, using the photosensor 4.

It should be understood by those skilled in the art, reading the teaching disclosed in this specification, that the control circuit according to this invention can be applied not only to the medium, for which concentric tracks are cut on the disk, but also to the disk on which a spiral track is cut. Further, the MARK pulse signal cut on the disk is not limited to one, but the same effect as that obtained in the embodiment of this invention explained above can be obtained by controlling the operation such that, when there are a plurality of recording sections on one track recording is not interrupted, unless one recording section is terminated, even if an interruption signal is inputted by disposing MARK pulse signal for each of the sections.

Further, the recording medium is not restricted to the circular disk indicated in the embodiment, but the same effect can be obtained, when a MARK pulse signal is cut for each of the recording sections for a medium for which linear tracks are cut and scanned linearly for the recording.

We claim:

1. An apparatus for controlling a recording operation of an optical information recording apparatus having a recording device for optically recording information signals on at least one recording track of a recording medium in which a positioning mark indicative of a start position of the information is disposed on said recording medium, comprising:

means for detecting said positioning mark and producing a mark signal in response to the positioning mark by tracing said recording medium;

counter means for counting to a predetermined number in response to said mark signal and for producing an output signal after counting to said predetermined number;

means for stopping a recording operation of said recording device when said counter means produces said output signal;

operation control means for producing a start command signal in response to a first external signal and for producing an interruption command signal in response to a second external signal; and driving control means for starting said recording device to record said information signals in response to a first mark signal from said detecting means after said operation control means produces said start command signal, and for interrupting the recording operation of said recording device in response to said first mark signal from said detecting means after said operation control means produces said interruption command signal.

2. An apparatus for controlling a recording operation according to claim 1, wherein said positioning mark is disposed on said recording medium at a position other than said at least one recording track.

3. An apparatus for controlling a recording operation according to claim 1, wherein at least one address signal identifying said at least one recording track is recorded at the beginning of said at least one recording track, said positioning mark detecting means detecting said address signals as the positioning mark so as to produce the mark signal.

4. An apparatus for controlling a recording operation according to claim 1, wherein said at least one recording track comprises a plurality of tracks cut in concentric circles on said recording medium.

5. An apparatus for controlling a recording operation according to claim 1, wherein said at least one recording track is cut spirally on said recording medium.

* * * * *